A. T. DUDLEY.
BALE FORMING PRESS.
APPLICATION FILED APR. 10, 1913.
1,158,654.
Patented Nov. 2, 1915.
2 SHEETS—SHEET 1.
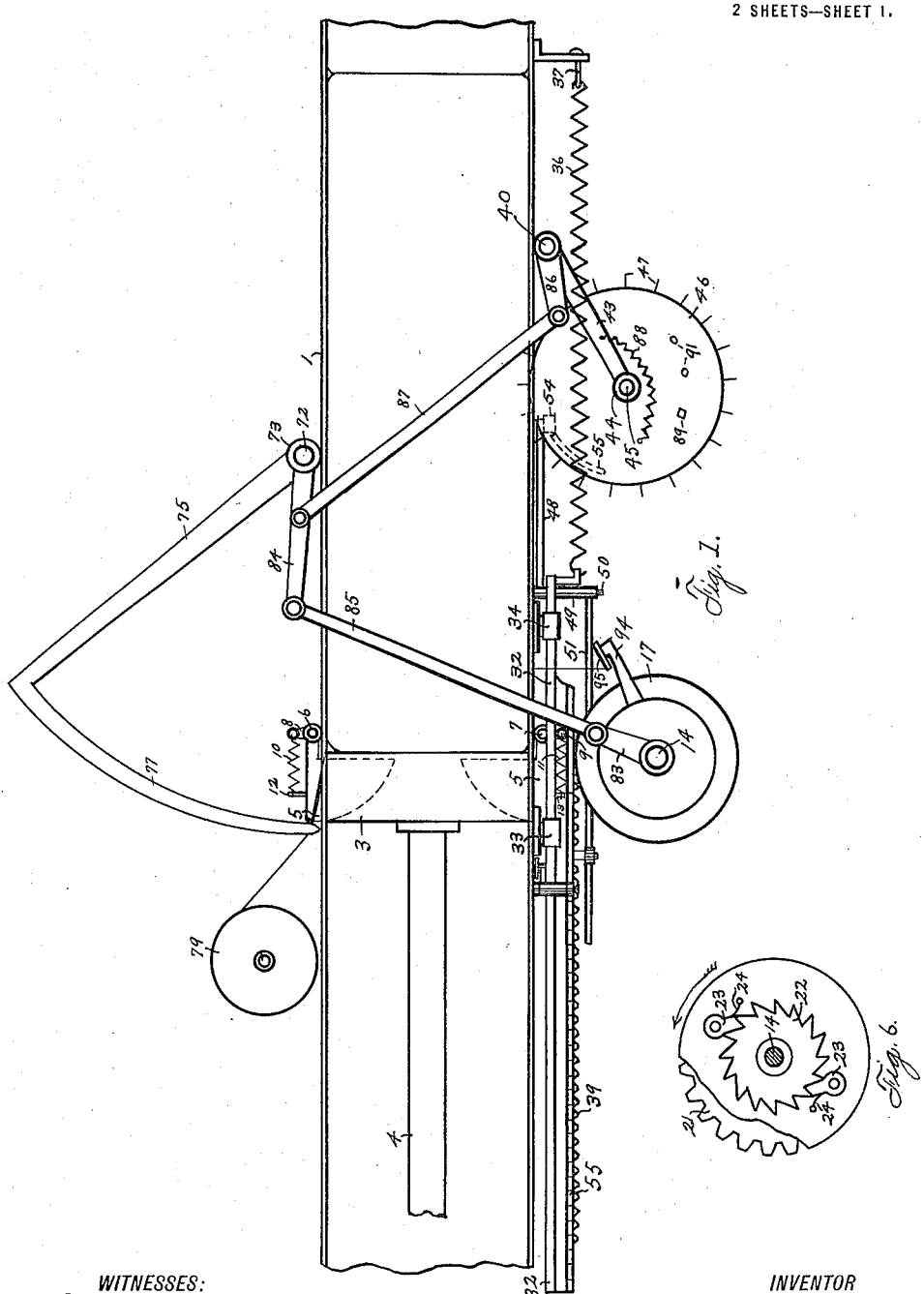
WITNESSES:
May Montgomery
INVENTOR
Andrew T. Dudley
BY
Hardway & Cathey
ATTORNEYS.

A. T. DUDLEY.
BALE FORMING PRESS.
APPLICATION FILED APR. 10, 1913.
1,158,654.
Patented Nov. 2, 1915.
2 SHEETS—SHEET 2.
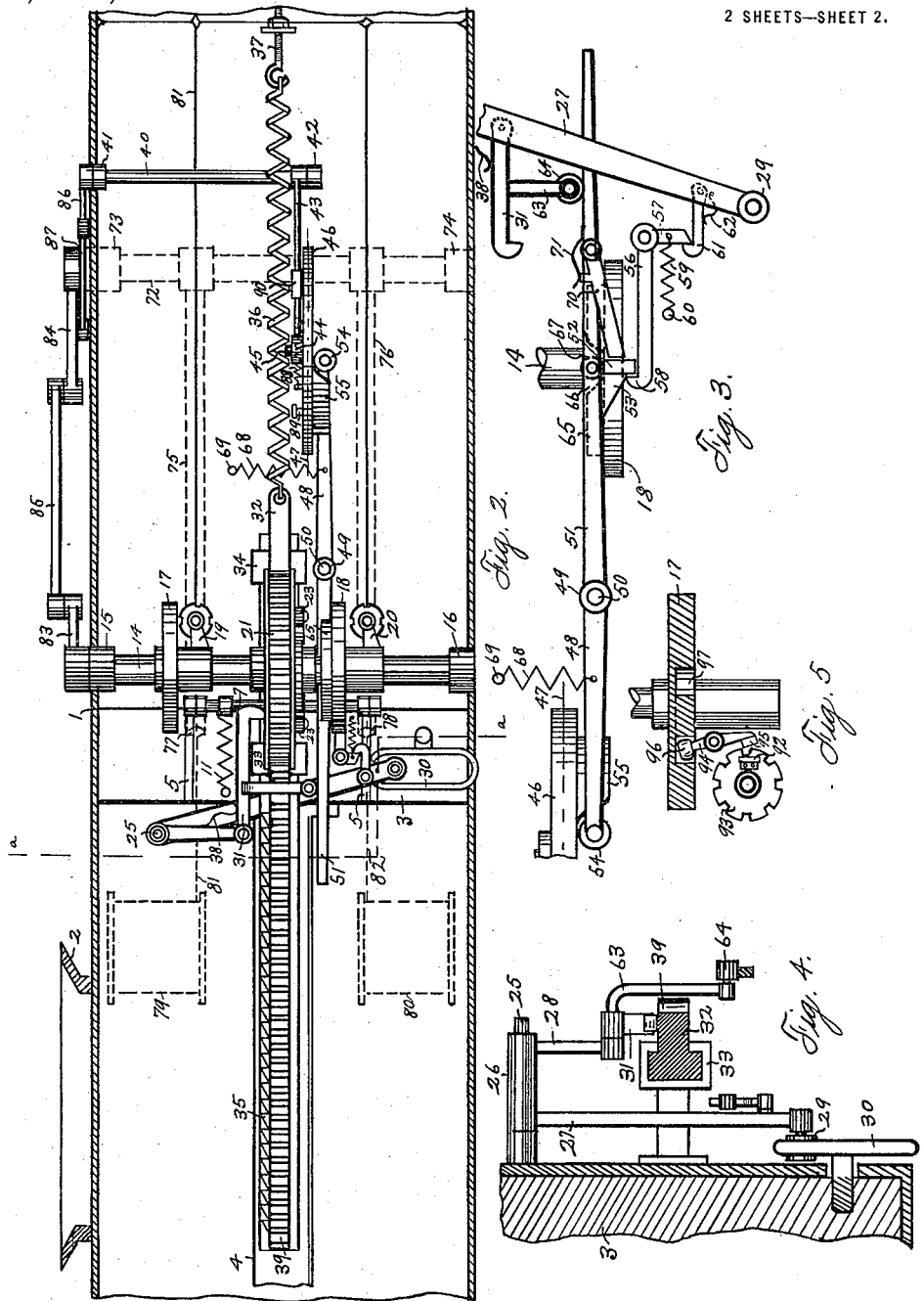
WITNESSES:
C Baylor Hull
May Montgomery
INVENTOR
A. T. Dudley.
BY
Hardway & Cathey
ATTORNEYS

UNITED STATES PATENT OFFICE.

ANDREW T. DUDLEY, OF HOUSTON, TEXAS, ASSIGNOR OF ONE-TENTH TO W. L. MITCHELL, J. H. MITCHELL, AND H. E. WERNER, ALL OF HOUSTON, TEXAS.

BALE-FORMING PRESS.

1,158,654.   Specification of Letters Patent.   Patented Nov. 2, 1915.

Application filed April 10, 1913. Serial No. 760,152.

*To all whom it may concern:*

Be it known that I, ANDREW T. DUDLEY, a citizen of the United States, residing at Houston, in the county of Harris and State of Texas, have invented certain new and useful Improvements in Bale-Forming Presses, of which the following is a specification.

This invention relates to new and useful improvements in bale forming presses.

The object of the invention is to provide a device of the character described by means of which hay or similar material may be compressed into a bale and embodying also means whereby when the bale is formed, tying wire or cords will be automatically secured there around to preserve the form of the bale.

A further feature of the invention resides in the provision of a mechanism for predetermining the time of operation of the tying mechanism so that it will be set into operation only upon the completion of the bale.

With the above and other objects in view, the invention has particular relation to certain novel features of construction, operation and arrangement of parts, an example of which is given in this specification and illustrated in the accompanying drawings, wherein—

Figure 1 is a plan view of the device. Fig. 2 is a side elevation thereof, shown partially in section. Fig. 3 is a fragmentary side elevation of the mechanism for releasing the tying mechanism to the operation of its driving means, the same being shown in a position the reverse of that shown in Fig. 2. Fig. 4 shows a fragmentary sectional end view of the plunger and the mechanism operated thereby, taken on the line *a—a* of Fig. 2. Fig. 5 is a fragmentary view, partially in section, of one of the knotters, and Fig. 6 is an end view of the knotter shaft, showing also the clutch connecting the same with the knotter driving mechanism.

Referring now more particularly to the drawings, wherein like numerals of reference designate similar parts in each of the figures, the numeral 1 refers to the compress chamber having the hopper 2 through which the material to be compressed is fed into said chamber. A plunger 3 is arranged to reciprocate back and forth in the chamber to which the plunger rod 4 is rigidly secured. This rod is operatively connected with a driving mechanism, (not shown) so as to be reciprocated back and forth thereby in any approved and well known manner.

Upon its back stroke the plunger 3 clears the discharge of the hopper 2 and upon its forward stroke drives the charge of material to be compressed forward and compresses the same, thus gradually forming the bale.

Upon each side of the compress chamber are two dogs 5, 5, two of said dogs being rigidly mounted upon each of the vertical shafts 6 and 7 which rotate in suitable bearings carried by the sides of the compress chamber. These dogs project through alined slots in the side walls of the compress chamber and their rear edges are rounded off or arcuate, so that the charge of the material to be compressed, as it is driven forward, causes the dogs to spread, permitting the charge to pass in front thereof. The front edges of these dogs are abrupt and when the charge has been driven past the dogs they drop back into alined slots in the sides of the plunger and fall behind the bale being formed.

The shafts 6 and 7, respectively, have arms 8 and 9 projecting therefrom and rigid therewith, to the free ends of which are attached the pull springs 10 and 11. These springs are also attached to the respective studs 12 and 13 projecting out from the sides of the compress chamber and the tension of said springs causes the dogs to drop into position and engage behind the bale being formed and on the next succeeding back stroke of the plunger the dogs hold the compression of the material already compressed.

Upon one side of the compress chamber is the vertical shaft 14 rotatably mounted in suitable bearings 15 and 16, carried by the compress chamber. This shaft carries the rigidly mounted disks 17 and 18 operatively connected with the respective knotters 19 and 20 which are operated by said disks. Loosely mounted upon the shaft 14 is a spur gear wheel 21 and fixed to the shaft 14 adjacent to the spur gear wheel 21 is a ratchet wheel 22. The spur gear wheel 21 has two opposing dogs 23, 23, pivoted thereto and normally held in engagement with the ratchet wheel by means of the respective flat springs 24, 24 which press against said dogs. It is thus obvious that as the spur gear wheel 21 is rotated in the direction indicated by the arrow in Fig. 6 that it will rotate independent of the shaft 14 and the ratchet wheel 22, but when rotated in the opposite direction, the dogs 23, 23 will engage with the ratchet wheel 22 and force said ratchet wheel 22 and shaft 14 to rotate with the spur gear wheel 21.

Projecting out from the wall of the compress chamber is a short shaft 25 upon which is mounted a short rotatable sleeve 26. Fixed to the inner end of said sleeve and extending downwardly therefrom is a long arm 27 and fixed to the outer end of said sleeve and extending downwardly therefrom is an arm 28. The arm 27 has an inwardly extending roller bearing 29 at its lower end. This bearing projects into a long link 30, which is fixed to the side of the plunger 3 so that as the plunger reciprocates back and forth the arms 27 and 28 are forced to move in unison therewith.

The lower end of the arm 28 has a dog 31 pivoted thereto. An oblong rack member 32 is slidably mounted in bearings 33 and 34, carried by the side of the compress chamber and the upper face of this rack member has rack teeth 35. A strong coil spring 36 is provided, one end of which is attached to the front end of the rack member 32 and the other end of which is secured to an adjustable hook 37 fixed to the discharge end of the compress chamber. The dog 31 is normally held in engagement with the rack teeth 35 by means of a flat spring 38 which is attached to the arm 28 and whose free end rests against the upper side of said dog. Upon the back stroke of the plunger, the same operates through the mechanism just described to move the rack member 32 rearwardly, overcoming the tension of the spring 36. The outer side of the rack member 32 has spur gear teeth 39 which engage with the teeth of the spur gear wheel 21 and as this member moves rearwardly the gear wheel 21 is rotated in the direction indicated by the arrow in Fig. 6. Upon the forward stroke of the plunger the dog 31 is moved forwardly, but the rack member 32 and the spur gear wheel 21 are locked against movement by the dogs 23, 23 and upon the next succeeding backward stroke of the plunger the rack member 32 is again moved rearwardly as before described.

Near the forward end of the compress chamber is a short vertical shaft 40 rotatably mounted in suitable bearings 41 and 42. The lower end of this shaft has an arm 43 which is rigid therewith and which projects rearwardly therefrom, whose free end has a bearing 44 in which the stub shaft 45 rotates. This shaft 45 carries a wheel 46 rigidly mounted thereon, from the periphery of which projects spikes 47 which engage with the bale being formed and as the bale moves along in the compress chamber the wheel 46 is rotated.

An arm 48 is provided which is fixed to the inner end of the sleeve 49. This sleeve rotates upon the shaft 50 projecting outwardly from the side of the compress chamber. The free end of the arm 48 extends under the wheel 46 and fixed to the outer end of the sleeve 49 and extending in the opposite direction is the arm 51 which extends above the disk 18. This disk has a shoulder 52 projecting out from the periphery thereof and the under side of the arm 51 has a corresponding shoulder 53 which normally rests against the shoulder 52 and locks the disk 18 against rotation. The free end of the arm 48 has a laterally extending roller bearing 54 and the under side of the wheel 46 has a cam 55. The roller bearing 54 is arranged in the path of the cam 55 and when said cam contacts with said bearing, the free end of the arm 48 is depressed and the free end of the arm 51 is elevated, carrying the shoulder 53 out of engagement with the shoulder 52.

Pivoted to the side of the compress chamber is a bell crank formed of the arms 56 and 57, the latter of which projects rearwardly and has a hook 58 provided to engage behind the shoulder 52 and temporarily hold the disk 18 against rotation when the arm 51 is disengaged from said shoulder. The arm 57 extends downwardly and one end of the pull spring 59 is attached thereto and the other end secured to the stud 60 projecting from the chamber wall and the tension of the spring tends to hold the arm 56 elevated and the hook 58 in engagement behind the shoulder 52.

The lower end of the arm 57 is beveled and a hook 61 is pivoted to the arm 27 near its lower end. A flat spring 62 is attached to said arm 27 and its free end rests against the lower side of the hook 61. As the plunger moves forwardly the hook 61 contacts with the lower beveled end of the arm 57 and is depressed thereby until it passes said end and the push of the spring 62 then causes said hook to engage over the end of said arm and as the plunger moves rearwardly, the hook 61 exerts a pull on the arm 57, thereby overcoming the tension of the spring 59 and releasing the hook 58 from the shoulder 52. The disk 18 is thus free to rotate and the shaft 14 is released to the tension of the spring 36 which is exerted through the rack member 32 and the spur gear wheel 21, said spur gear wheel rotating in the direction opposite of that indicated by the arrow in Fig. 6. Fixed to the dog 31 is a downwardly extending arm 63, whose lower end carries a roller 64 which rests upon the arm 51 and when the free end of said arm is elevated, as herein before described, the dog 31 is thus held out of engagement with the rack teeth 35 during the forward movement of the rack member 32. The upper face of the disk 18 has an annular flange 65, having a recess 66 in one side and projecting laterally from the arm 51 is a roller bearing 67 which rests in said recess while the disk 18 is at rest. While said disk is rotating, however, the roller 67 rides around upon said flange 65 and holds the arm 51 elevated after the cam 55 has passed the roller 54 and until the disk 18 has performed a complete revolution, and the bale is tied.

A pull spring 68 is attached at one end to the arm 48 and at its other end to the stud 69, projecting out from the chamber wall and the tension of this spring operates to elevate the arm 48 and lower the arm 51 when the bearing 67 has reached the recess 66 in the flange 65. A latch 70 is pivoted at one end to the arm 51 and its free end normally opposes the shoulder 53 but sufficient space is left for the shoulder 52. The free end of this latch projects down into the path of the shoulder 52 as the disk 18 rotates and during the rotation of said disk when the shoulder 52 comes in contact with the underside of said latch the latch rises until the shoulder has passed the free end of the same and comes in contact with the shoulder 53. The latch is then depressed by means of the flat spring 71, one end of which is secured to the arm 51 and the other end of which rests against the upper side of said latch. When the free end of the latch 70 has dropped behind the shoulder 52, the disk 18 is locked against movement in either direction until released by the disengagement therefrom of the shoulder 53 and the hook 58, as hereinbefore described.

Upon the opposite side of the compress chamber from the knotter shaft 14 is a needle shaft 72 rotatably mounted in suitable bearings 73 and 74. The needle chamber has two arms 75 and 76 which are fixed thereto at one end. The free ends of these arms have the needles 77 and 78 which are alined with corresponding slots in the sides of the compress chamber through which said needles are designed to pass and rotatably mounted upon the side of the compress chamber opposite the knotters 19 and 20 are spools 79 and 80 which carry the baling wires 81 and 82 wrapped thereon. These respective wires pass through eyes in the points of the respective needles 77 and 78 and through the slots in the compress chamber alined therewith and extend across said chamber and their free ends are secured to the respective knotters 19 and 20. As the bale is formed it is forced against said wires which embrace it upon its forward end and sides and the needles then carry the baling wires around the rear end of the bale and they are secured around the bale by means of the knotters 19 and 20. Rigidly secured to the upper end of the knotter shaft 14 is an arm 83 and rigidly secured to the upper end of the needle shaft 73 is an arm 84, the arm 83 being considerably shorter than the arm 84 and the free ends of these arms are connected by a link 85 whose ends are pivoted to the respective free ends of said arms 83 and 84. As the shaft 14 rotates, the arm 83 is forced to rotate therewith and as oscillatory movement is imparted to the arm 84 through the link 85, which in turn is transmitted to the shaft 72 and through it to the needles 77 and 78 and said needles are driven through the compress chamber and carry the baling wires 81 and 82 around the rear end of the bale and coöperate with the knotters 19 and 20 to tie said baling wires.

The upper end of the shaft 40 has an arm 86 which is rigid therewith and the free end of said arm is connected by means of the link 87 with the arm 84, said link being pivoted at its respective ends to said arms. As the needles are driven through the compress chamber, the arm 84 operates through the link 87 and arm 86 to partially rotate the shaft 40 and the arm 43 and the wheel 46 mounted thereon are swung around and the spikes 47 are disengaged from the bale. A pull spring 88 is provided, one end of which is attached to the arm 43 and the other end of which is secured to the wheel 46 so that when the spikes 47 are disengaged from the bale the wheel 46 is rotated back to its original position through the pull of the spring 88. Projecting upwardly from the wheel 46 is a pin 89 which engages against the shoulder 90 carried by the arm 43 and limits the backward turn of the wheel 46. This pin may be adjusted in the holes 91 and the amount of backward turn of the wheel 46 thus determined and the length of the bale will thus be regulated accordingly.

As before stated, the knotters 19 and 20 are substantially of the form now in common use in grain binding machines, but for the purpose of severing the wire, the knotters have been somewhat modified, as will now be explained. A stationary blade 92 is fixed to the disk 93. Pivoted, at an intermediate point, to the knotter frame is an arm 94 whose outer end carries a blade 95 and whose other end has a roller bearing 96 which projects into the eccentric groove 97 in the under face of the knotter disk. This groove is formed so that when the knot is tied the roller bearing 96 and the corresponding end of the arm 94 will be forced inwardly toward the center of the disk and the blade 95 will thus be forced to coöperate with the blade 92 in the manner of shears and will cut the wire which at that time is held between said blades by the disk 93.

What I claim is:—

1. A device of the character described including a compress chamber, a plunger arranged to reciprocate therein, a laterally extending needle arranged to move back and forth through the compress chamber and carrying a securing cord around a bale therein, a knotter arranged to co-act with the needle and secure said tying cord around said bale, a mechanism operatively connected with said knotter, and also with the needle and imparting a swinging movement to the needle simultaneously with the operation of the knotter, a means for locking said knotter against movement, a means for releasing said knotter from its locking means, and a means operatively connected with the knotter and operating the same when said knotter is released from its locking means.

2. A device of the character described, including a compress chamber, a plunger arranged to reciprocate therein, a laterally extending needle arranged to move back and forth through the compress chamber and carry a securing cord around the bale therein, a knotter arranged to co-act with the needle and knot said tying cord around said bale, a mechanism operatively connected with said knotter, and also with the needle and imparting a swinging movement to the needle simultaneously with the operation of the knotter, a means for locking said knotter against movement, a means operated by the bale as it moves along in the compress chamber for releasing said knotter from its locking means, and a means operatively connected with the knotter and operating the same when the knotter is released from its locking means.

3. A device of the character described, including a compress chamber, a plunger arranged to reciprocate therein, a needle arranged to move back and forth through the compress chamber and carry a securing cord around the bale therein, a knotter arranged to co-act with the needle and secure said cord around said bale, a mechanism operatively connected with said knotter and also with the needle and imparting a swinging movement to the needle simultaneously with the operation of the knotter, a means for locking said knotter against movement, a means operated by the bale as it moves along in the compress chamber for releasing said knotter from its locking means, a means controlled by the plunger and arranged to temporarily engage with the knotter after it is released from its locking means for predetermining the time of the operation of the knotter relative to the movement of the plunger, and a means operatively connected with the knotter and operating the same when the knotter is released from its locking means.

4. A device of the character described, including a compress chamber, a plunger arranged to reciprocate therein, a needle arranged to move back and forth through the compress chamber and carry a cord around the bale therein, a knotter arranged to coact with the needle and secure said cord around said bale, a mechanism operatively connected with said knotter and also with the needle and imparting a swinging movement to the needle, and forcing the same through the compress chamber simultaneously with the operation of the knotter, a means for locking said knotter against movement, a means operated by the bale as it moves along in the compress chamber for releasing said knotter from said locking means, a pull spring, a member operatively connected with the knotter to which said pull spring is attached, a mechanism operated by the plunger and connecting with said member intermittently whereby said pull spring is put under tension during the formation of the bale, said pull spring being provided to operate the knotter when it is released from its locking means.

5. A device of the character described, including a compress chamber, a plunger arranged to reciprocate therein, a needle arranged to move back and forth through the compress chamber and carry a cord around the bale therein, a knotter arranged to coact with the needle and secure the cord around the bale, a mechanism operatively connected with said knotter and also with the needle and imparting a swinging movement to the needle simultaneously to the operation of the knotter, a means for locking said knotter against movement, a means operated by the bale as it moves along in the compress chamber for releasing said locking means from the knotter upon the completion of the bale, a means operated by the needle operative means and disconnecting the means operated by the bale, from said bale when the bale is completed, and a means operatively connected with the knotter and operating the same when the knotter locking means is released therefrom.

6. A device of the character described, including a compress chamber, a plunger arranged to reciprocate therein, a needle shaft rotatably mounted on one side of said chamber, a knotter shaft rotatably mounted on the other side of said chamber, a plurality of knotters operatively connected with the knotter shaft, a plurality of needles carried by the needle shaft, a mechanism operatively connecting the knotter shaft and needle shaft so that the rotation of the former will impart a partial rotation in each direction to the latter and cause the needles to swing back and forth through the compress chamber, a means for locking said knotters against movement while the bale is being formed in the compress chamber, a means operated by the bale as it moves along in the compress chamber for releasing said locking means, a means controlled by the plunger and arranged to temporarily prevent the operation of the knotters after said locking means is released until the plunger begins its backward movement, a rack member, a means operatively connecting said rack member with said knotters and imparting movement from the former to the latter, a pull spring secured to said rack member and to the frame work of the device, and a mechanism operated by the plunger and operating to move said rack member against the tension of the spring.

7. A device of the character described including a compress chamber, a plunger arranged to reciprocate therein, a needle shaft mounted on one side of said chamber, a knotter shaft rotatably mounted upon the other side of said chamber, a plurality of knotters operatively connected with the knotter shaft, a plurality of needles carried by the needle shaft and provided to carry a tying cord through the compress chamber and around the bale therein, a mechanism operatively connecting the knotter shaft and needle shaft so that the rotation of the former will impart an oscillating movement to the latter and swing the needles back and forth through the compress chamber, a rack member, a spur gear wheel carried by the knotter shaft and operatively connected with the rack member and rotated by said member as it moves in either direction, a pull spring secured to said rack member and to the framework of the device, a mechanism operated by the plunger and operating to move said rack member against the tension of said spring while the bale is being formed, a means for locking said knotters against movement while the bale is being formed, a means operated by the bale as it moves along in the compress chamber for releasing said locking means and thereby releasing said rack member to the pull of said spring, and a mechanism for connecting said gear wheel to said knotter shaft and against independent rotation thereon when said rack member is released to the pull of said pull spring.

8. A device of the character described including a compress chamber, a plunger arranged to reciprocate therein, a needle shaft mounted on one side of said chamber, a knotter shaft rotatably mounted upon the other side of said shaft, a plurality of knotters operatively connected with the knotter shaft, a plurality of needles carried by the needle shaft and provided to carry a tying cord through the compress chamber and around the bale therein, a mechanism operatively connecting the knotter shaft and needle shaft so that the rotation of the former will impart an oscillating movement to the latter and swing the needles back and forth through the compress chamber, a rack member, a spur gear wheel carried by the knotter shaft and operatively connected with the rack member and rotated by said member as it moves in either direction, a pull spring secured to said rack member and to the framework of the device, a mechanism operated by the plunger and operating to move said rack member against the tension of said spring while the bale is being formed, a means for locking said knotters against movement while the bale is being formed, a means operated by the bale as it moves along in the compress chamber for releasing said locking means and thereby releasing said rack member to the pull of said spring, a means operated by the needle operative mechanism and connected to said releasing means and disconnecting the same from the bale simultaneously with the needle movement, and a mechanism for connecting said gear wheel to said knotter shaft when said rack member is released to the pull of said spring.

9. A device of the character described, including a compress chamber, a plunger arranged to reciprocate therein, a needle arranged to move back and forth through the compress chamber and carry a securing cord around the bale therein, a knotter arranged to co-act with the needle and secure said cord around said bale, a mechanism operatively connected with said knotter and also with the needle and imparting a swinging movement to the needle simultaneously with the operation of the knotter, a means for locking said knotter against movement and a means operated by the bale as it moves along the compress chamber for releasing said knotter from its locking means.

10. A device of the character described including a compress chamber, a plunger arranged to reciprocate therein, a needle arranged to move back and forth across the compress chamber and carry a securing cord around the bale therein, a knotter arranged to co-act with the needle and secure said cord around said bale, a mechanism operatively connected with said knotter and also with the needle and imparting a swinging movement to the needle simultaneously with the operation of the knotter, a means for locking said knotter against movement, a means operated by the bale as it moves along in the compress chamber for releasing said knotter from its locking means and a means controlled by the plunger and arranged to temporarily engage with the knotter after it is released from its locking means for predetermining the time of the operation of the knotter relative to the movement of the plunger.

In testimony whereof I have signed my name to this specification in the presence of two subscribing witnesses.

ANDREW T. DUDLEY.

Witnesses:
J. W. YEAGLEY,
A. F. IRWIN.

Copies of this patent may be obtained for five cents each, by addressing the "Commissioner of Patents, Washington, D. C."